US 11,705,098 B2

(12) United States Patent
Ibayashi et al.

(10) Patent No.: US 11,705,098 B2
(45) Date of Patent: *Jul. 18, 2023

(54) SOUND ABSORBING MATERIAL

(71) Applicant: Eneos Corporation, Tokyo (JP)

(72) Inventors: Kunihiko Ibayashi, Tokyo (JP);
Hiroaki Konishi, Tokyo (JP);
Muneyuki Shiina, Tokyo (JP);
Masahiro Wakayama, Chiba (JP)

(73) Assignee: Eneos Corporation ( * ) Notice: Subject to any disclaimer, the term of this patent is extended or adjusted under 35 U.S.C. 154(b) by 729 days.

This patent is subject to a terminal disclaimer.

(21) Appl. No.: 16/624,583

(22) PCT Filed: Jun. 15, 2018

(86) PCT No.: PCT/JP2018/022954
§ 371 (c)(1),
(2) Date: Dec. 19, 2019

(87) PCT Pub. No.: WO2018/235741
PCT Pub. Date: Dec. 27, 2018

(65) Prior Publication Data
US 2020/0135159 A1 Apr. 30, 2020

(30) Foreign Application Priority Data

Jun. 21, 2017 (JP) ................. 2017-121674

(51) Int. Cl.
B32B 5/24 (2006.01)
G10K 11/162 (2006.01)
(Continued)

(52) U.S. Cl.
CPC ........... G10K 11/162 (2013.01); B32B 5/022 (2013.01); B32B 5/24 (2013.01); B32B 5/266 (2021.05);
(Continued)

(58) Field of Classification Search
CPC .... B32B 2262/0253; B32B 2262/0276; B32B 2262/101; B32B 2266/0278;
(Continued)

(56) References Cited

U.S. PATENT DOCUMENTS 8,590,111 B2* 11/2013 Hergeth ................. D01G 25/00
19/302
2013/0065014 A1 3/2013 Miyagawa et al.
2015/0322603 A1* 11/2015 Brown ..................... D04H 1/72
264/114

FOREIGN PATENT DOCUMENTS

JP H08190384 A 7/1996
JP H10203268 A 8/1998
(Continued)

OTHER PUBLICATIONS

International Preliminary Report on Patentability with Written Opinion for Application No. PCT/JP2018/022954 dated Jan. 2, 2020, 6 pages.
(Continued)

Primary Examiner — Lawrence D Ferguson
(74) Attorney, Agent, or Firm — Lerner David LLP

(57) ABSTRACT

The sound absorbing material according to the present invention is formed by laminating a porous sound absorber and two or more sheets of a nonwoven fabric one on another. The nonwoven fabric has a plurality of drawn filaments arranged and oriented in one direction. The mode value of the diameter distribution of the plurality of filaments is in the range of 1 to 4 μm. The grammage of the nonwoven fabric is in the range of 5 to 40 g/m². The sound absorbing material according to the present invention provides high sound absorption performance in a predetermined low frequency band of 6000 Hz or less, and still remains light in weight and (Continued)

flexible enough and easy enough to handle to be substantially comparable to the porous sound absorber.

11 Claims, 7 Drawing Sheets

(51) Int. Cl.
*B32B 5/02* (2006.01)
*G10K 11/168* (2006.01)
*B32B 5/26* (2006.01)
*B60R 13/08* (2006.01)

(52) U.S. Cl.
CPC ...... *G10K 11/168* (2013.01); *B32B 2307/102* (2013.01); *B60R 13/08* (2013.01); *D10B 2401/063* (2013.01)

(58) Field of Classification Search
CPC .......... B32B 2307/102; B32B 2307/54; B32B 2307/718; B32B 2419/00; B32B 2605/00; B32B 5/022; B32B 5/18; B32B 5/24; B32B 5/245; B32B 5/26; B32B 5/266; B60R 13/08; D04H 3/04; D10B 2401/063; E04B 1/86; G10K 11/162; G10K 11/168
See application file for complete search history.

(56) References Cited

FOREIGN PATENT DOCUMENTS

| | | | |
|---|---|---|---|
| JP | H10240269 | A | 9/1998 |
| JP | 2000334867 | A | 12/2000 |
| JP | 2001293834 | A | 10/2001 |
| JP | 200269824 | A | 3/2002 |
| JP | 2005195989 | A | 7/2005 |
| JP | 2006028708 | A | 2/2006 |
| JP | 2006296463 | A | 11/2006 |
| JP | 2007334285 | A | 12/2007 |
| JP | 2009275801 | A | 11/2009 |
| JP | 2010128005 | A | 6/2010 |
| JP | 2011246839 | A | 12/2011 |
| JP | 2015028230 | A | 2/2015 |
| WO | 2018097326 | A1 | 5/2018 |

OTHER PUBLICATIONS

Chinese Office Action for Application No. 201880039967.7 dated Feb. 3, 2021; 7 pages.
Search Report from Chinese Office Action for Application No. 201880039967.7 dated Feb. 3, 2021; 3 pages.
International Search Report from Application No. PCT/JP2018/022954 dated Sep. 4, 2018, 3 pages.

* cited by examiner

| GRAMMAGE (g/m$^2$) | THICKNESS ($\mu$m) | LONGITUDINAL TENSILE STRENGTH (N/50mm) | LONGITUDINAL ELONGATION PERCENTAGE (%) | AIR PERMEABILITY (cm$^3$/cm$^2$·s) |
|---|---|---|---|---|
| 5 | 17 | 28 | 5 | 219 |
| 10 | 30 | 56 | 7 | 57 |
| 15 | 42 | 85 | 9 | 26 |
| 20 | 55 | 113 | 12 | 15 |
| 40 | 110 | 260 | 38 | 9 |

SOUND ABSORBING MATERIAL

CROSS-REFERENCE TO RELATED APPLICATIONS

The present application is a national phase entry under 35 U.S.C. § 371 of International Application No. PCT/JP2018/022954, filed Jun. 15, 2018, which claims priority to Japanese Patent Application No. 2017-121674, filed Jun. 21, 2017, the disclosures of which are incorporated herein by reference.

TECHNICAL FIELD

The present invention relates to a sound absorbing material, and more particularly, relates to a sound absorbing material formed by laminating a porous sound absorber and two or more sheets of a nonwoven fabric one on another.

BACKGROUND ART

Heretofore, sound absorbing materials have been used in various products such as vehicles, houses, and electrical products in order mainly to reduce noise. The sound absorbing materials are grouped into several classes according to their materials and shapes. Sound absorbing materials made of porous media (such as felts, glass wools, and polyurethane foams) are known as one such class (such sound absorbing materials may also be referred to as porous sound absorbers).

REFERENCE DOCUMENT LIST

Patent Document

Patent Document 1: JP 2005-195989 A

SUMMARY OF THE INVENTION

Problem to be Solved by the Invention

The porous sound absorbers are lightweight, flexible, and relatively easy to handle. For these reasons, the porous sound absorbers are being used for a greater number of purposes in recent years, and accordingly, they are being required to have enhanced properties, such as improved sound absorption performance.

Means for Solving the Problem

The present inventors found that when two or more sheets of a nonwoven fabric that satisfies certain conditions are combined with (laminated on) a porous sound absorber as described above, the resultant material has significantly improved sound absorption performance in a predetermined low frequency band of 6000 Hz or less as compared to the porous sound absorber alone. The present invention has been made based on this finding.

According to an aspect of the present invention, a sound absorbing material is formed by laminating a porous sound absorber and two or more sheets of a nonwoven fabric one on another. The nonwoven fabric has a plurality of drawn filaments arranged and oriented in one direction. The mode value of the diameter distribution of the plurality of filaments is in the range of 1 to 4 μm. The grammage of the nonwoven fabric is in the range of 5 to 40 g/m$^2$.

Effects of the Invention

According to the present invention, it is possible to provide a sound absorbing material that is capable of providing high sound absorption performance in a predetermined low frequency band of 6000 Hz or less, and that still remains light in weight and flexible enough and easy enough to handle to be substantially comparable to the porous sound absorber alone.

MODES FOR CARRYING OUT THE INVENTION

Figure 1:
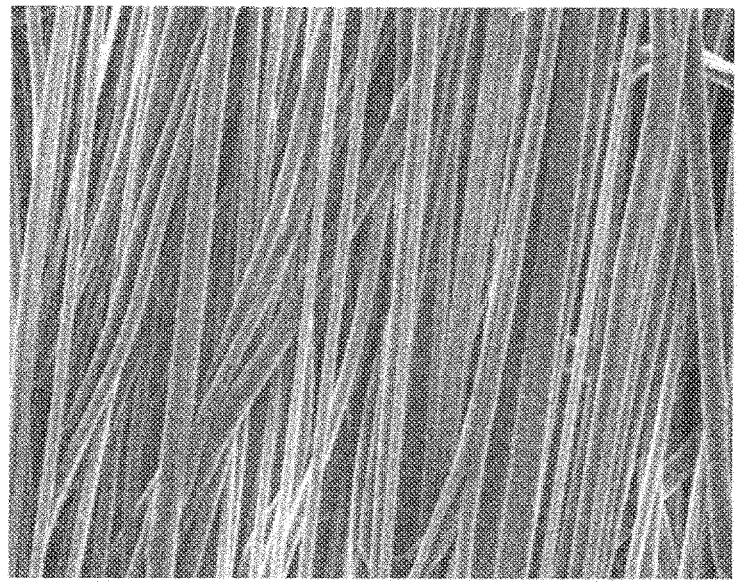
FIG. 1 is an enlarged photograph (with 1000× magnification) of a unidirectionally oriented nonwoven fabric, which is an example of a nonwoven fabric constituting a sound absorbing material according to the present invention, photographed by a scanning electron microscope.

The present invention provides a sound absorbing material formed by laminating a porous sound absorber and two or more sheets of a nonwoven fabric one on another. The porous sound absorber in the sound absorbing material according to the present invention may also be referred to as "porous sound absorbing material", and examples of the porous sound absorber may include felts, urethane foams, and glass wools. The nonwoven fabric includes a plurality of drawn filaments arranged and oriented in one direction, and the mode value of the diameter distribution of the plurality of filaments is in the range of 1 to 4 µm. The grammage of the nonwoven fabric is in the range of 5 to 40 g/m². As will be described later, the sound absorbing material according to the present invention is capable of providing high sound absorption performance in a predetermined low frequency band of 6000 Hz or less as compared to the porous sound absorber alone.

Each sheet of the nonwoven fabric combined with the porous sound absorber to constitute the sound absorbing material according to the present invention, that is, a nonwoven fabric having a plurality of drawn filaments arranged and oriented in one direction may, for example, be a "unidirectionally oriented nonwoven fabric", which includes a plurality of drawn filaments (long-fibers) arranged and oriented in one direction. As used herein, the "one direction" does not necessarily refer strictly to a single direction, but merely refers to being substantially is a single direction. The unidirectionally oriented nonwoven fabric as described above may be produced through production steps including arranging and orienting a plurality of filaments in one direction, and drawing the plurality of arranged and oriented filaments in the one direction, for example.

As used herein, "arranging and orienting a plurality of filaments in one direction" indicates arranging and orienting the plurality of filaments so that the length direction (axial direction) of each filament coincides with the one direction, that is, so that the arranged and oriented filaments extend substantially in the one direction. For example, when the unidirectionally oriented nonwoven fabric is manufactured in a long sheet form, the one direction may be the lengthwise direction (also referred to as "longitudinal direction") of the long sheet, or a direction inclined with respect to the lengthwise direction of the long sheet, or the width direction (also referred to as "transverse direction") of the long sheet, or a direction inclined with respect to the transverse direction of the long sheet. Also as used herein, "drawing the plurality of arranged and oriented filaments in the one direction" indicates drawing each of the plurality of filaments substantially in its axial direction. By drawing the plurality of filaments in one direction after arranging and orienting the filaments in the one direction, molecules in each filament are oriented in the one direction in which the filament is drawn, that is, oriented in the axial direction of the filament.

FIG. 1 is an enlarged photograph (with 1000× magnification) of the unidirectionally oriented nonwoven fabric, an example of the nonwoven fabric, photographed by a scanning electron microscope. In the unidirectionally oriented nonwoven fabric shown in FIG. 1, filaments are oriented substantially in the up-down direction of FIG. 1.

In addition to the drawn filaments arranged and oriented in one direction (first filaments), each sheet of the nonwoven fabric combined with the porous sound absorber to constitute the sound absorbing material according to the present invention may further include second filaments that are drawn filaments arranged and oriented in a direction orthogonal to the one direction. In other words, each sheet of the nonwoven fabric may be an "orthogonally oriented nonwoven fabric", which includes a plurality of drawn filaments arranged and oriented in two directions that are orthogonal to each other. As used herein, these two "orthogonal" directions do not have to be strictly orthogonal, but have merely to be substantially orthogonal. The orthogonally oriented nonwoven fabric as described above may be produced, for example, by stacking and fusing two sheets of the unidirectionally oriented nonwoven fabric together in an arrangement in which filaments in one of these two sheets are orthogonal to filaments in the other.

In the sound absorbing material according to the present invention, two or more sheets of the nonwoven fabric may be stacked one on another to form a nonwoven laminate. In other words, the sound absorbing material according to the present invention may include the porous sound absorber, and a nonwoven laminate formed of a stack of two or more sheets of the nonwoven fabric. In the nonwoven laminate, the axial direction of the filaments may be the same or be randomly different among the stacked sheets of the nonwoven fabric.

The nonwoven laminate has merely to be formed by stacking a plurality of sheets of the nonwoven fabric in their thickness direction. The nonwoven laminate may be formed by either simply stacking the plurality of sheets of the nonwoven fabric (uncompressed state) or stacking and compressing the plurality of sheets of the filament nonwoven fabric (compressed state). Also, in the nonwoven laminate, the sheets of the nonwoven fabric may be separable from each other or may be partially or entirely integrated with each other. For the reasons above, the orthogonally oriented nonwoven fabric may correspond to both the nonwoven fabric and the nonwoven laminate.

In the sound absorbing material according to the present invention, the porous sound absorber is typically formed in a sheet shape or a block shape. The sound absorbing material according to the present invention is formed by disposing the nonwoven fabric or the nonwoven laminate on at least one of the front and back surfaces of the porous sound absorber. Here, the porous sound absorber and either the nonwoven fabric or the nonwoven laminate may be integrated so as to be separable, or may be integrated by fusion or adhesion so as not to be separable.

Hereinafter, some embodiments of the sound absorbing material according to the present invention will be described with reference to FIGS. 2A to 2C.

Figure 2A:
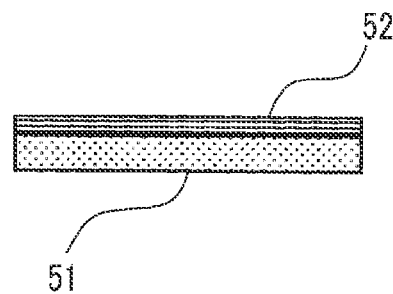
FIG. 2A is a cross-sectional view showing a schematic configuration of a sound absorbing material according to a first embodiment.

FIG. 2A is a cross-sectional view showing a schematic configuration of a sound absorbing material according to a first embodiment. As shown in FIG. 2A, the sound absorbing material according to the first embodiment is formed by disposing a nonwoven laminate 52 on the front surface (or back surface) of a porous sound absorber 51. The number of (stacked) sheets of the nonwoven fabric constituting the nonwoven laminate 52 may be set as desired.

Figure 2B:
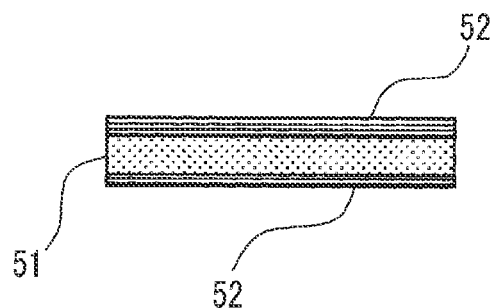
FIG. 2B is a cross-sectional view showing a schematic configuration of a sound absorbing material according to a second embodiment.

FIG. 2B is a cross-sectional view showing a schematic configuration of a sound absorbing material according to a second embodiment. As shown in FIG. 2B, the sound absorbing material according to the second embodiment is formed by disposing the nonwoven laminates 52 on the front and back surfaces of the porous sound absorber 51. In other words, the sound absorbing material according to the second embodiment is formed by disposing the porous sound absorber 51 between two nonwoven laminates 52. In the sound absorbing material according to the second embodiment, the two nonwoven laminates 52 are not necessarily the same as each other. For example, the type or types of the filament nonwoven fabric constituting one of the two nonwoven laminates 52 may differ from that or those of the other nonwoven laminate 52. Additionally or alternatively, the number of sheets of the filament nonwoven fabric constituting one of the two nonwoven laminates 52 may differ from that of the other nonwoven laminate 52. Also, either or each of the two nonwoven laminates 52 may be replaced with the nonwoven fabric.

Figure 2C:
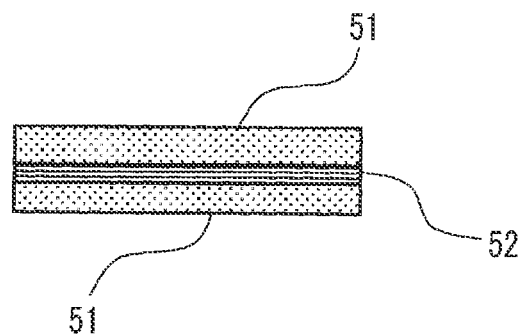
FIG. 2C is a cross-sectional view showing a schematic configuration of a sound absorbing material according to a third embodiment.

FIG. 2C is a cross-sectional view showing a schematic configuration of a sound absorbing material according to a third embodiment. As shown in FIG. 2C, the sound absorbing material according to the third embodiment is formed by disposing the porous sound absorbers 51 on the front and back surfaces of the nonwoven laminate 52. In other words, the sound absorbing material according to the third embodiment is formed by disposing the nonwoven laminate 52 between two porous sound absorbers 51. In the sound absorbing material according to the third embodiment, the two porous sound absorbers 51 are not necessarily the same as each other. For example, the two porous sound absorbers 51 may differ from each other in type and/or shape (such as thickness). As with the first embodiment, the number of (stacked) sheets of the nonwoven fabric constituting the nonwoven laminate 52 may be set as desired.

The sound absorbing materials according to the first to third embodiments may each be used alone in one or more sheets, or may be used in any combination as desired.

Next, the nonwoven fabric constituting the sound absorbing material according to the present invention will be specifically described. As described above, the nonwoven fabric constituting the sound absorbing material according to the present invention may be either the unidirectionally oriented nonwoven fabric or the orthogonally oriented nonwoven fabric. In the following description, the term "longitudinal (direction)" may refer to the machine direction (MD direction), i.e., the feed direction of the nonwoven fabric during production (corresponding to the length direction of the nonwoven fabric). The term "transverse (direction)" may refer to a direction (TD direction) orthogonal to the longitudinal direction, i.e., a direction orthogonal to the feed direction (corresponding to the width direction of the nonwoven fabric).

Unidirectionally Oriented Nonwoven Fabric: Longitudinally Oriented Filament Nonwoven Fabric A longitudinally oriented filament nonwoven fabric, which is an example of the unidirectionally oriented nonwoven fabric, is obtained by arranging and orienting a plurality of filaments made of a thermoplastic resin in the longitudinal direction, that is, so that the length direction (axial direction) of each filament substantially coincides with the longitudinal direction, and drawing these arranged and oriented filaments in the longitudinal direction (axial direction). In the longitudinally oriented filament nonwoven fabric, molecules in each filament are oriented in the longitudinal direction. Here, the longitudinal drawing ratio of each of the filaments is in the range of 3 to 6. The mode value of the diameter distribution of the filaments (i.e., the drawn filaments) constituting the longitudinally oriented filament nonwoven fabric is in the range of 1 to 4 μm, preferably in the range of 2 to 3 μm. Furthermore, the average diameter of the filaments constituting the longitudinally oriented filament nonwoven fabric is in the range of 1 to 4 μm, preferably in the range of 2 to 3 μm. The variation coefficient of the diameter distribution of the filaments constituting the longitudinally oriented filament nonwoven fabric is in the range of 0.1 to 0.3, preferably in the range of 0.15 to 0.25. Here, the variation coefficient is obtained by dividing the standard deviation of the diameters of the filaments constituting the longitudinally oriented filament nonwoven fabric by the average of the diameters (average filament diameter).

As long as they are substantially long, the filaments are not particularly limited. For example, the filaments may have an average length greater than 100 mm. Furthermore, the filaments have merely to have an average diameter in the range of 1 to 4 μm. The longitudinally oriented filament nonwoven fabric may additionally contain filaments having a diameter less than 1 μm and/or filaments having a diameter greater than 4 μm. The length and diameter of the filaments can be measured using, for example, an enlarged photograph of the longitudinally oriented filament nonwoven fabric photographed by a scanning electron microscope. Specifically, the average and standard deviation of the filament diameters can be calculated from N (50, for example) measurements of the filament diameters, and then the variation coefficient of the filament diameter distribution can be obtained by dividing the standard deviation by the average filament diameter.

The grammage (weight per unit area) w of the longitudinally oriented filament nonwoven fabric may be in the range of 5 to 40 g/m$^2$, preferably in the range of 10 to 30 g/m$^2$. The grammage may be calculated based, for example, on the average of measured weights of 300 mm×300 mm sheets of the nonwoven fabric. The longitudinally oriented filament nonwoven fabric has a thickness t of 10 to 90 μm, preferably 25 to 60 μm. The specific volume t/w (cm$^3$/g) of the longitudinally oriented filament nonwoven fabric obtained by dividing the thickness t by the grammage w is in the range of 2.0 to 3.5. Such a specific volume t/w in the range of 2.0 to 3.5 indicates that the thickness of the longitudinally oriented filament nonwoven fabric is small relative to the grammage. The air permeability of the longitudinally oriented filament nonwoven fabric is in the range of 5 to 250 cm$^3$/cm$^2$·s, preferably in the range of 10 to 70 cm$^3$/cm$^2$·s.

Furthermore, the folding width of the filaments in producing the longitudinally oriented filament nonwoven fabric is preferably 300 mm or more. Allowing the filaments to function as long continuous fibers in turn requires a relatively large folding width. As will be described later, after being spun, the filaments are vibrated in the longitudinal direction and arranged folded back on the conveyor. The folding width of the filaments refers to the average of the substantially straight distances between the bends of such a folded filament, and can be visually observed in the longitudinally oriented filament nonwoven fabric made by drawing these filaments. In the manufacturing method (manufacturing apparatus) described later, such a folding width can be changed depending on, for example, the speed of the high-speed airstream and/or the rotation speed of the airstream vibration mechanism.

The filaments are obtained by melt-spinning a thermoplastic resin. As long as it is melt-spinnable, the thermoplastic resin is not particularly limited. Typically, a polyester, in particular, a polyethylene terephthalate having an intrinsic viscosity (IV) of 0.43 to 0.63, preferably 0.48 to 0.58, is used as the thermoplastic resin. Alternatively, polypropylene may be used as the thermoplastic resin. These materials are suitable for their good spinnability using meltblowing process or the like. The thermoplastic resin may contain additives such as an antioxidant, a weathering agent, and a coloring agent in an amount of about 0.01 to 2% by weight. Additionally or alternatively, a flame-retardant resin such as a flame-retardant polyester, which is provided with flame retardancy by copolymerization with flame-retardant phosphorus components, may be used as the thermoplastic resin, for example.

Next, an example of a method of manufacturing the longitudinally oriented filament nonwoven fabric will be described. The method of manufacturing the longitudinally oriented filament nonwoven fabric includes the steps of: producing a nonwoven web including a plurality of filaments arranged and oriented in the longitudinal direction, and obtaining a longitudinally oriented filament nonwoven fabric by uniaxially drawing the produced nonwoven web (that is, the plurality of filaments arranged and oriented in the longitudinal direction).

Specifically, the step of producing the nonwoven web includes: preparing a set of nozzles configured to extrude a plurality (large number) of filaments, a conveyor belt configured to collect and convey the filaments extruded from the set of nozzles, and an airstream vibrating means configured to vibrate a high-speed airstream directed to the filaments; extruding the plurality (large number) of filaments from the set of nozzles onto the conveyor belt; allowing the filaments extruded from the set of nozzles to accompany the high-speed airstream so as to reduce the filament diameter, and causing the airstream vibrating means to periodically vary the direction of the high-speed airstream in the travel direction of the conveyor belt (that is, in the longitudinal direction). Through these steps, a nonwoven web including a plurality of filaments arranged and oriented in the travel direction of the conveyor belt (that is, in the longitudinal direction) is produced in the step of producing the nonwoven web. In the step of obtaining the longitudinally oriented filament nonwoven fabric, the nonwoven web produced in the step of producing the nonwoven web is uniaxially drawn in the longitudinal direction so as to obtain the longitudinally oriented filament nonwoven fabric. The drawing ratio is in the range of 3 to 6.

Here, regarding the set of nozzles, the number of nozzles, the number of nozzle holes, the nozzle hole pitch P, the nozzle hole diameter D, and the nozzle hole length L may be set as desired. Preferably, the nozzle hole diameter D may be in the range of 0.1 to 0.2 mm and the value L/D may be in the range of 10 to 40.

Figure 3:
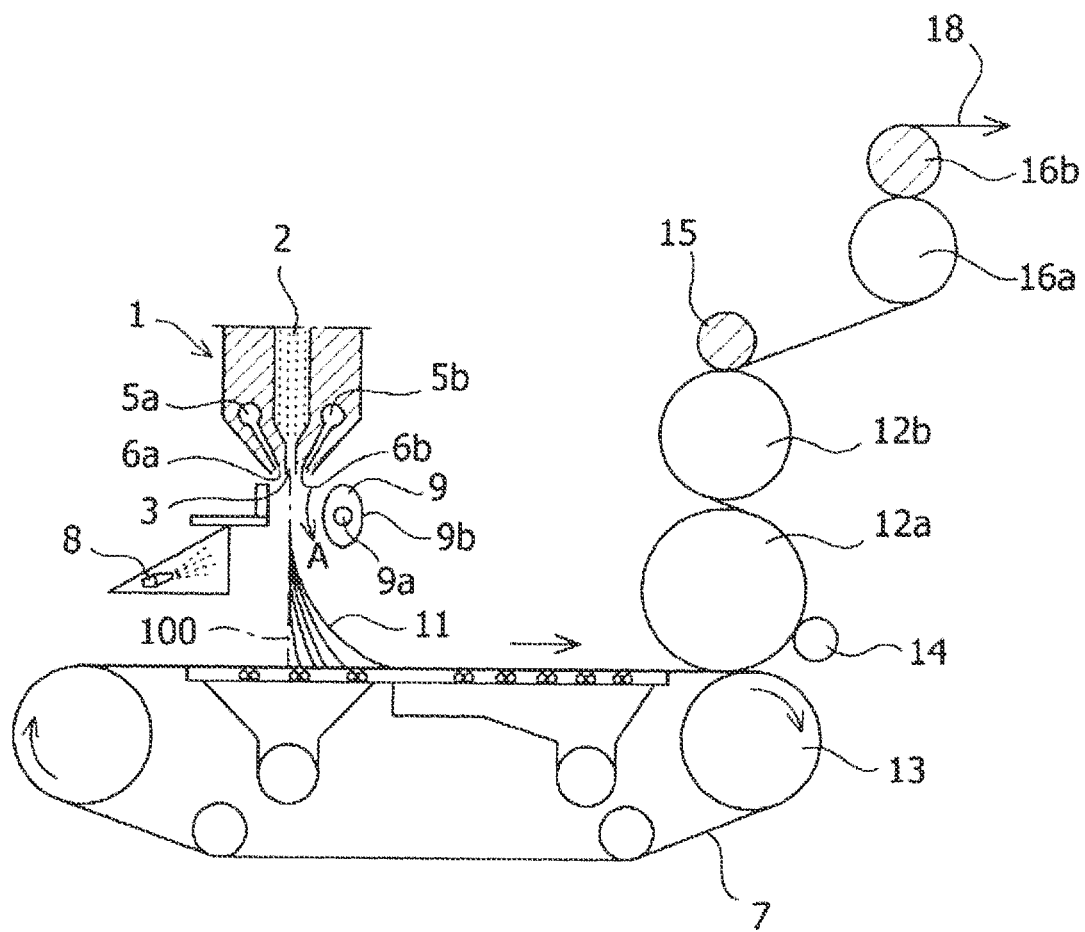
FIG. 3 is a cross-sectional view showing a schematic configuration of an example of a manufacturing apparatus of a longitudinally oriented filament (long-fiber) nonwoven fabric, which is an example of a filament nonwoven fabric (the unidirectionally oriented nonwoven fabric).

FIG. 3 is a cross-sectional view showing a schematic configuration of an example of a manufacturing apparatus of the longitudinally oriented filament nonwoven fabric. The manufacturing apparatus shown in FIG. 3 is configured to manufacture the longitudinally oriented filament nonwoven fabric by meltblowing process, and includes a meltblowing die 1, a conveyor belt 7, an airstream vibration mechanism 9, drawing cylinders 12a, 12b, take-up nip rollers 16a, 16b, and the like.

First, at the upstream end of the manufacturing apparatus, a thermoplastic resin (a thermoplastic resin mainly containing a polyester or a polypropylene, in this example) is introduced into an extruder (not shown) and melted and extruded by the extruder. Then, the extruded thermoplastic resin is passed to the meltblowing die 1.

The meltblowing die 1 has a large number of nozzles 3 at its distal end (lower end). The nozzles 3 are lined up in a direction orthogonal to the plane of FIG. 3, that is, in a direction orthogonal to the travel direction of the conveyor belt 7. The molten resin 2 passed to the meltblowing die 1 by a gear pump (not shown) or the like is extruded from the nozzles 3, so that a large number of filaments 11 are formed (spun). Note that FIG. 3, which is a cross-sectional view of the meltblowing die 1, shows only one of the nozzles 3. The meltblowing die 1 includes air reservoirs 5a, 5b provided on the opposite sides of each nozzle 3. High-pressure air heated to a temperature equal to or higher than the melting point of the thermoplastic resin is fed into these air reservoirs 5a, 5b, and then jetted from slits 6a, 6b. The slits 6a, 6b communicate with the air reservoirs 5a, 5b and open to the distal end of the meltblowing die 1. As a result of air jetting, a high-speed airstream substantially parallel to the extrusion direction of the filaments 11 from the nozzles 3 is formed below the nozzles 3. This high-speed airstream maintains the filaments 11 extruded from the nozzles 3 in a draftable molten state, and applies frictional forces to the filaments 11 so as to draft the filaments 11 and reduce the diameter of the filaments 11. The diameter of the filaments 11 immediately after being spun is preferably 10 µm or less. The high-speed airstream formed below the nozzles 3 has a temperature higher than the spinning temperature for the filaments 11 by 20° C. or more, preferably by 40° C. or more.

In the method of forming the filaments 11 with the meltblowing die 1, an increased temperature of the high-speed airstream allows increasing the temperature of the filaments 11 immediately after being extruded from the nozzles 3 to be sufficiently higher than the melting point of the filaments 11, and thereby allows reduction of the diameter of the filaments 11.

The conveyor belt 7 is disposed below the meltblowing die 1. The conveyor belt 7 is wound around conveyor rollers 13 and other rollers configured to be rotated by a driver (not shown). By rotating the conveyor rollers 13 to drive the conveyor belt 7 to move, the filaments 11 extruded from the nozzles 3 and accumulated on the conveyor belt 7 are conveyed in the arrow direction (right direction) of FIG. 3.

The airstream vibration mechanism 9 is provided at a predetermined location between the meltblowing die 1 and the conveyor belt 7, specifically, at a location in (near) a space through which a high-speed airstream flows. Here, the high-speed airstream is a combination of the high-pressure heated air flows that are jetted from the opposite slits 6a, 6b of the nozzles 3. The airstream vibration mechanism 9 has an elliptical cylindrical portion having an elliptical cross section, and support shafts 9a extending from the opposite ends of the elliptical cylindrical portion. The airstream vibration mechanism 9 is disposed substantially orthogonal to the direction in which the filaments 11 are conveyed by the conveyor belt 7, that is, disposed substantially in parallel to the width direction of the longitudinally oriented filament nonwoven fabric to be manufactured. The airstream vibration mechanism 9 is configured such that the elliptical cylindrical portion rotates in the direction of arrow A as the support shafts 9a are rotated. Disposing and rotating the elliptical cylindrical airstream vibration mechanism 9 near the high-speed airstream allows the direction of the high-speed airstream to be changed by the Coanda effect, as will be described later. It should be noted that the present invention is not limited to the manufacturing apparatus having a single airstream vibration mechanism 9, and the manufacturing apparatus may have a plurality of airstream vibration mechanisms 9 as necessary to increase the vibration amplitude of the filaments 11.

The filaments 11 flow along the high-speed airstream. The high-speed airstream, which is a combination of the high-pressure heated air flows that are jetted from the slits 6a, 6b, flows in a direction substantially orthogonal to the conveying surface of the conveyor belt 7. In this connection, it is generally known that when there is a wall near the high-speed jet flow of gas or liquid, the jet flow tends to pass near surfaces of the wall. Such a phenomenon is called the Coanda effect. The airstream vibration mechanism 9 uses this Coanda effect to change the direction of the high-speed airstream and thus, the flow of the filaments 11.

It is desirable that the width of the airstream vibration mechanism 9 (the elliptical cylindrical portion), that is, the length of the airstream vibration mechanism 9 in the direction parallel to the support shafts 9a, be greater than the width of the filament set to be spun by the meltblowing die 1 by 100 mm or more. If the width of the airstream vibration mechanism 9 were smaller than the above, the airstream vibration mechanism 9 would fail to sufficiently change the flow direction of the high-speed airstream at the opposite ends of the filament set, and thus, the filaments 11 would not be oriented satisfactorily in the longitudinal direction at the opposite ends of the filament set. The minimum distance between a circumferential wall surface 9b of the airstream vibration mechanism 9 (the elliptical cylindrical portion) and the axis 100 of the high-speed airstream is 25 mm or less, preferably 15 mm or less. If the minimum distance between the airstream vibration mechanism 9 and the airstream axis 100 were greater than the above, the effect of attracting the high-speed airstream to the airstream vibration mechanism 9 would be reduced and the airstream vibration mechanism 9 might fail to vibrate the filaments 11 satisfactorily.

Here, the vibration amplitude of the filaments 11 depends on the speed of the high-speed airstream and the rotation speed of the airstream vibration mechanism 9. Accordingly, the speed of the high-speed airstream is set to 10 m/sec or more, preferably 15 m/sec or more. If the speed of the high-speed airstream were lower than the above, the high-speed airstream might not be attracted satisfactorily to the circumferential wall surface 9b of the airstream vibration mechanism 9, and the airstream vibration mechanism 9 might fail to vibrate the filaments 11 satisfactorily. The rotation speed of the airstream vibration mechanism 9 may be set so as to vibrate the circumferential wall surface 9b at a frequency that maximizes the vibration amplitude of the filaments 11. Such a maximizing vibration frequency, which varies depending on the spinning conditions, is determined appropriately according to the spinning conditions.

In the manufacturing apparatus shown in FIG. 3, spray nozzles 8 are provided between the meltblowing die 1 and the conveyor belt 7. The spray nozzles 8 are configured to spray water mist or the like into the high-speed airstream. The filaments 11 are cooled and rapidly solidified by the water mist or the like sprayed by the spray nozzles 8. Note that, to avoid unnecessary complications, FIG. 3 shows only one of the spray nozzles 8, although there are actually multiple nozzles.

The solidified filaments 11 are vibrated in the longitudinal direction in the course of being accumulated onto the conveyor belt 7, and successively collected on the conveyor belt 7 with end portions folded back in the longitudinal direction. The filaments 11 on the conveyor belt 7 are conveyed in the arrow direction (right direction) of FIG. 3 by the conveyor belt 7, then they are nipped by a presser roller 14 and a drawing cylinder 12a heated to the drawing temperature, and then they are transferred onto the drawing cylinder 12a. Thereafter, the filaments 11 are nipped by the drawing cylinder 12b and a presser rubber roller 15, and transferred onto the drawing cylinder 12b. As a result, the filaments 11 are held tight between these two drawing cylinders 12a, 12b. Conveying the filaments 11 held tight between the drawing cylinders 12a, 12b produces a nonwoven web in which adjacent ones of the filaments 11 with end portions folded back in the longitudinal direction are fused to each other.

After that, the nonwoven fabric is taken up by the take-up nip rollers 16a, 16b (the downstream take-up nip roller 16b is made of rubber). The circumferential speed of the take-up nip rollers 16a, 16b is set greater than the circumferential speed of the drawing cylinders 12a, 12b. This allows the nonwoven web to be longitudinally drawn to be 3 to 6 times longer than the original length. In this way, a longitudinally oriented filament nonwoven fabric 18 is manufactured. If necessary, the nonwoven web may further be subjected to a post-processing including heating or partial bonding such as heat embossing or the like. Here, the drawing ratio can be defined, for example, using marks applied at regular intervals on the nonwoven web before drawing the filaments by the following equation:

Drawing ratio="distance between the marks after drawing"/"distance between the marks before drawing".

As described above, the average diameter of the filaments constituting the longitudinally oriented filament nonwoven fabric 18 thus manufactured is in the range of 1 to 4 μm (preferably 2 to 3 μm). The variation coefficient of the diameter distribution of the filaments constituting the longitudinally oriented filament nonwoven fabric 18 thus manufactured is in the range of 0.1 to 0.3. In a preferred embodiment, the longitudinally oriented filament nonwoven fabric 18 may have an elongation percentage in the range of 1 to 20%, preferably 5 to 15% in the direction parallel to the filaments, that is, in the longitudinal direction which coincides with the axial direction and the drawing direction of the filaments. That is, the longitudinally oriented filament nonwoven fabric 18 may be elastic in the longitudinal direction. The tensile strength in the longitudinal direction of the longitudinally oriented filament nonwoven fabric 18 is 20 N/50 mm or more. The elongation percentage and tensile strength are measured by JIS L1096 8.14.1 A-method.

Unidirectionally Oriented Nonwoven Fabric: Transversely Oriented Filament Nonwoven Fabric A transversely oriented filament nonwoven fabric, which is another example of the unidirectionally oriented nonwoven fabric, is obtained by arranging and orienting a plurality of filaments made of a thermoplastic resin in the transverse direction, that is, so that the length direction (axial direction) of each filament substantially coincides with the transverse direction, and drawing these arranged and oriented filaments in the transverse direction. In the transversely oriented filament nonwoven fabric, molecules in each filament are oriented in the transverse direction. Note that description for components that may be similar with those in the longitudinally oriented filament nonwoven fabric will be omitted as appropriate below.

Figure 4A:
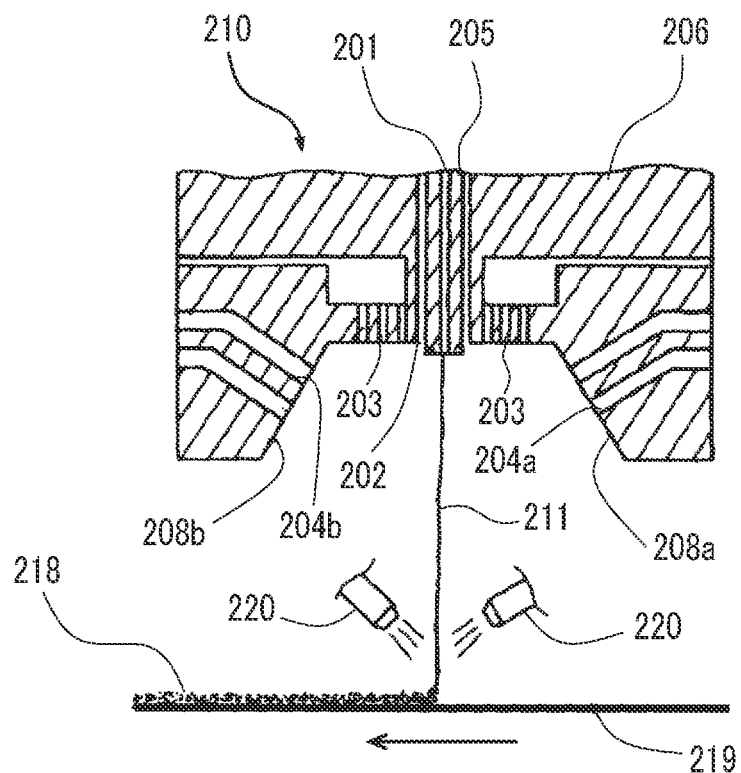
FIG. 4A is a cross-sectional view of a principal portion of a manufacturing apparatus of a transversely oriented filament nonwoven fabric, which is an example of the filament nonwoven fabric (the unidirectionally oriented nonwoven fabric).
Figure 4B:
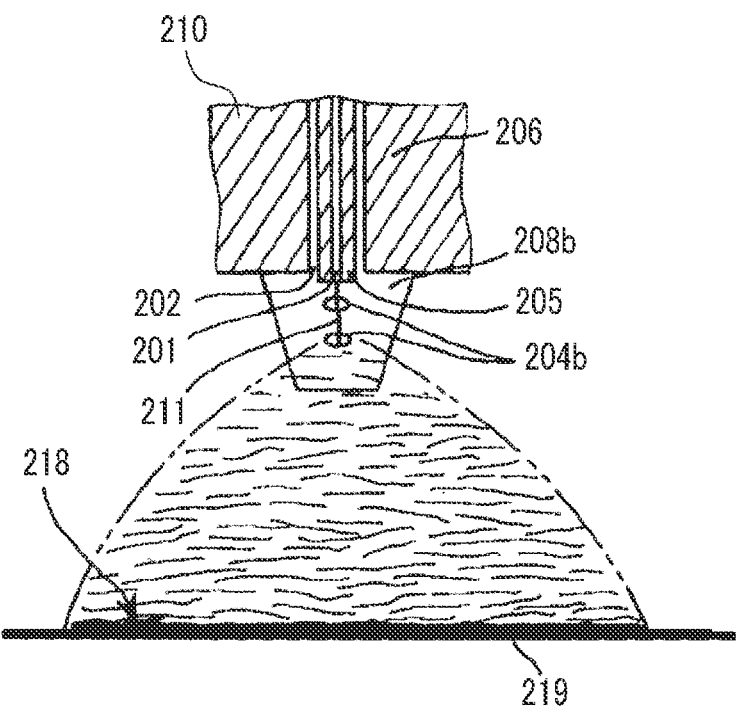
FIG. 4B is a cross-sectional view of a principal portion of the manufacturing apparatus of the transversely oriented filament nonwoven fabric, taken in the direction orthogonal to that of FIG. 4A.

FIGS. 4A and 4B show a schematic configuration of a principal portion of an example of a manufacturing apparatus of the transversely oriented filament nonwoven fabric. FIG. 4A is a cross-sectional view of a principal portion of the manufacturing apparatus of the transversely oriented filament nonwoven fabric. FIG. 4B is a cross-sectional view of a principal portion of the manufacturing apparatus of the transversely oriented filament nonwoven fabric, taken in the direction orthogonal to that of FIG. 4A. As shown in FIGS. 4A and 4B, the manufacturing apparatus of the transversely oriented filament nonwoven fabric includes a spinning head 210, a conveyor belt 219, a drawing device (not shown), and the like. In FIGS. 4A and 4B, the spinning head 210 is shown in a cross-sectional view so that the internal structure thereof can be seen. In this manufacturing apparatus, the conveyor belt 219 is disposed below the spinning head 210 and is configured to travel in the arrow direction (left direction) of FIG. 4A.

Figure 5A:
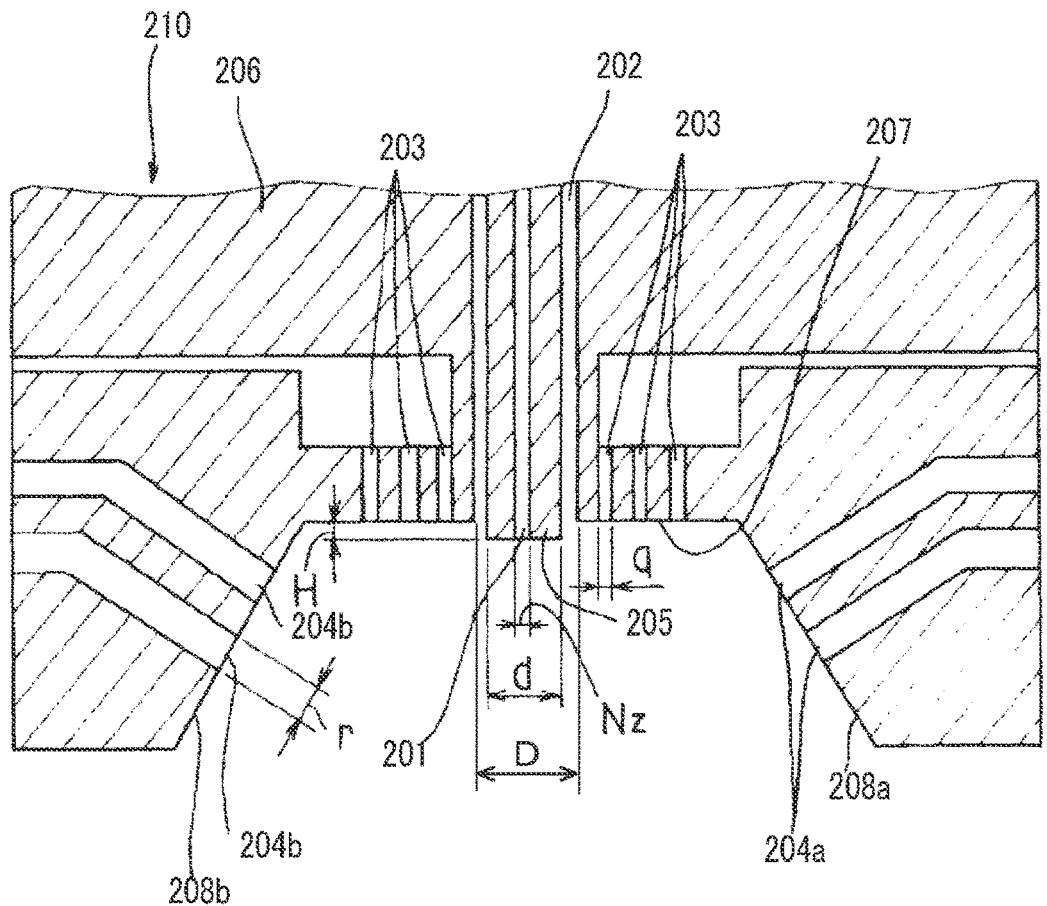
FIG. 5A is a cross-sectional view of a spinning head used in the manufacturing apparatus of the transversely oriented filament nonwoven fabric.
Figure 5B:
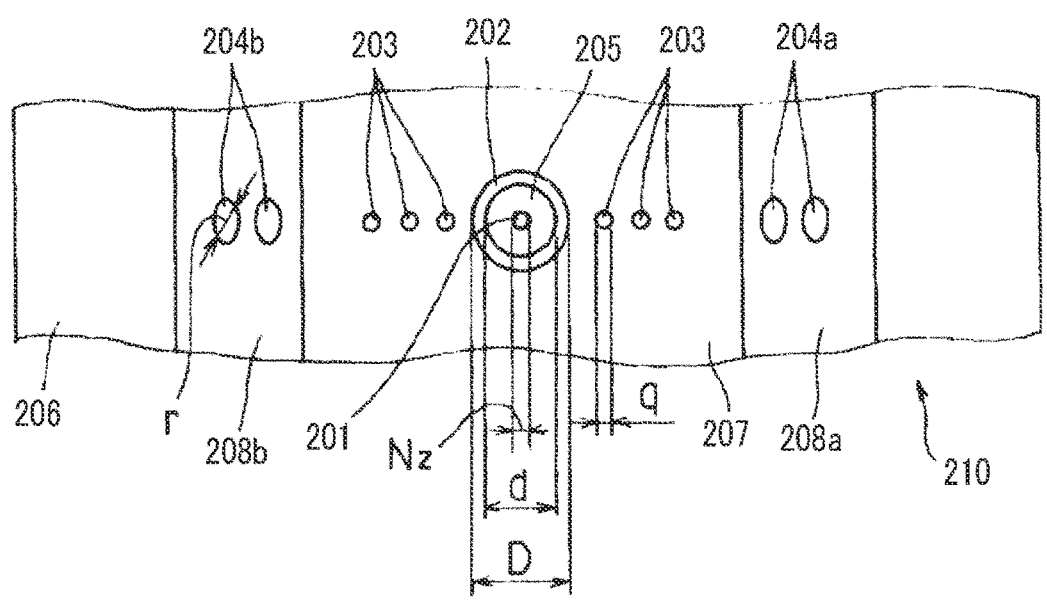
FIG. 5B is a bottom view of the spinning head.

FIGS. 5A and 5B show the spinning head 210. FIG. 5A is a cross-sectional view of the spinning head 210. FIG. 5B is a bottom view of the spinning head 210.

The spinning head 210 includes an air jet portion 206, and a cylindrical spinning nozzle portion 205 disposed in the interior of the air injection portion 206. A spinning nozzle 201 extending in the direction of gravity and opening to the lower end surface of the spinning nozzle portion 205 is formed through the spinning nozzle portion 205. The nozzle hole diameter Nz of the spinning nozzle 201 may be set as desired, and may be, for example, in the range of 0.1 to 0.7 mm. The spinning head 210 is disposed above the conveyor belt 219 so that the spinning nozzle 201 is positioned substantially at the center in the width direction of the conveyor belt 219. The molten resin is supplied to the spinning nozzle 201 from above by a gear pump (not shown) or the like, and the supplied molten resin passes through the spinning nozzle 201 and extruded downward from the lower open end of the spinning nozzle 201, so that filaments 211 are formed (spun).

The lower surface of the air jet portion 206 has a recess defined by two inclined surfaces 208a, 208b. The bottom surface of the recess constitutes a horizontal surface 207 orthogonal to the direction of gravity. One of the inclined surfaces 208a is located at one end of the horizontal surface 207 in the travel direction of the conveyor belt 219. The other inclined surface 208b is located at the other end of the horizontal surface 207 in the travel direction of the conveyor belt 219. The two inclined surfaces 208a, 208b are disposed symmetrically with respect to the plane orthogonal to the horizontal surface 207 and passing through the centerline of the spinning nozzle 201 so as to be inclined so that the distance between the inclined surfaces 208a, 208b gradually increases downward.

The lower end surface of the spinning nozzle portion 205 is disposed so as to protrude from the horizontal surface 207 at a center portion of the horizontal surface 207 of the air jet portion 206. The protrusion amount H of the lower end surface of the spinning nozzle portion 205 from the horizontal surface 207 may be set as desired, and may be, for example, in the range of 0.01 to 1 mm. An annular primary air slit 202 configured to jet high-temperature primary air is formed between the outer circumferential surface of the spinning nozzle portion 205 and the air jet portion 206. The outer diameter of the spinning nozzle portion 205, that is, the inner diameter d of the primary air slit 202 may be set as desired, and may be, for example, 2.5 to 6 mm. Although not shown in the drawings, slit-shaped flow paths are formed in the interior of the spinning head 210 in order mainly to homogenize the speed and temperature of the primary air jetted from the primary air slit 202. At least some of the intervals between the slit-shaped flow paths are in the range of 0.1 to 0.5 mm. Through the slit-shaped flow paths, the high-temperature primary air is supplied to the primary air slit 202.

When the high-temperature primary air is supplied to the primary air slit 202 from above, the high-temperature primary air passes through the primary air slit 202, and is jetted downward at a high speed from the open end, close to the horizontal surface 207, of the primary air slit 202. As the primary air is jetted from the primary air slit 202 at a high speed, a reduced pressure is generated below the lower end surface of the spinning nozzle portion 205, and this reduced pressure vibrates the filaments 211 extruded from the spinning nozzle 201.

Furthermore, secondary air jet ports 204a, 204b configured to jet high-temperature secondary air are also formed in the air jet portion 206. The purpose of jetting the secondary air is to spread the filaments 211 vibrated by the primary air jetted from the primary air slit 202 and to orient the filaments 211 in one direction. Each of the secondary air jet ports 204a has an opening in the inclined surface 208a and extends inward in the air jet portion 206 in a direction orthogonal to the inclined surface 208a. Similarly, each of the secondary air jet ports 204b has an opening in the inclined surface 208b and extends inward in the air jet portion 206 in a direction orthogonal to the inclined surface 208b. The secondary air jet ports 204a, 204b are disposed symmetrically with respect to the plane that is orthogonal to the horizontal surface 207 and passes through the centerline of the spinning nozzle 201. The diameter r of the secondary air jet ports 204a, 204b may be set as desired, and may preferably be in the range of 1.5 to 5 mm. In this embodiment, the two secondary air jet ports 204a and two secondary air jet ports 204b are formed. However, the number of secondary air jet ports 204a, 204b is not limited thereto and may be set as desired.

The secondary air jet ports 204a, 204b are configured to jet the secondary air slightly downward from the horizontal direction. The secondary air jetted from the secondary air jet ports 204a and the secondary air jetted from the secondary air jet ports 204b collide with each other below the spinning nozzle 201 and spread in the width direction of the conveyor belt 219. As a result, the falling, vibrating filaments 211 spread in the width direction of the conveyor belt 219.

Furthermore, a plurality of small holes 203 are formed on the opposite sides across the spinning nozzle portion 205. Each small hole 203 has an opening in the horizontal surface 207 and extends in parallel to the spinning nozzle 201. The small holes 203 are lined up in a straight line orthogonal to the centerline of the spinning nozzle 201. The same number (three, in this example) of small holes 203 are formed on each of the opposite sides across the spinning nozzle portion 205, one of which is closer to the secondary air jet ports 204a and the other of which is closer to the secondary air jet ports 204b. The small holes 203 are configured to jet high-temperature air downward from the open ends in the horizontal surface 207, thereby contributing to stable spinning of the filaments 211. The diameter q of each small hole 203 may be set as desired, and may preferably be about 1 mm. The high-temperature air jetted from the small holes 203 may be introduced either from the source of the primary air to be jetted from the primary air slit 202, or from the source of the secondary air to be jetted from the secondary air jet ports 204a, 204b. Alternatively, high-temperature air other than the primary air and the secondary air may be supplied to the small holes 203.

Furthermore, a pair of cooling nozzles 220 is provided between the spinning head 210 and the conveyor belt 219. In this embodiment, one of the cooling nozzles 220 is disposed upstream of the filaments 211 spun from the spinning nozzle 201 in the travel direction of the conveyor belt 219. The other of the cooling nozzles 220 is disposed downstream of the filaments 211 spun from the spinning nozzle 201 in the travel direction of the conveyor belt 219. The cooling nozzles 220 spray water mist or the like onto the filaments 211 before the filaments 211 reach the conveyor belt 219, and thereby cool and solidify the filaments 211. The number and locations of the cooling nozzles 220 may be set as desired.

The solidified filaments 211 are accumulated on the conveyor belt 219 so as to be arranged and oriented in the width direction of the conveyor belt 219. Thereby, the nonwoven web 218 formed of the filaments 211 arranged and oriented in the width direction is produced on the conveyor belt 219.

The nonwoven web 218 produced on the conveyor belt 219 is conveyed by the conveyor belt 219 in the arrow direction of FIG. 4A, and then transversely drawn by the drawing device (not shown) to be 3 to 6 times longer than the original length. In this way, the transversely oriented filament nonwoven fabric is manufactured.

Figure 6A:
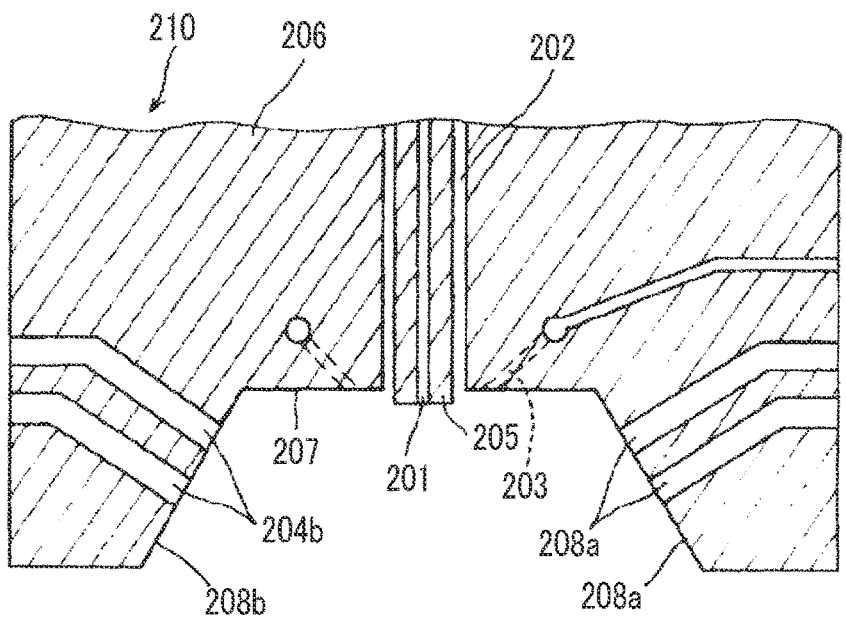
FIG. 6A is a cross-sectional view of a modified example of the spinning head.
Figure 6B:
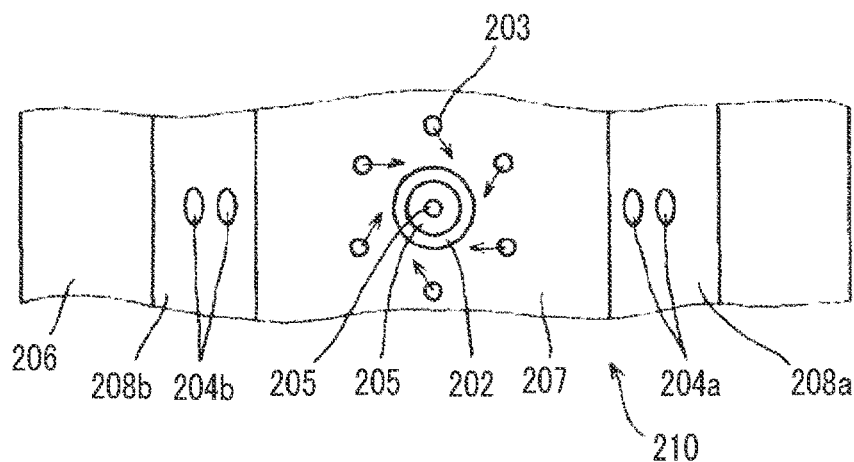
FIG. 6B is a bottom view of the modified example of the spinning head.
Figure 6C:
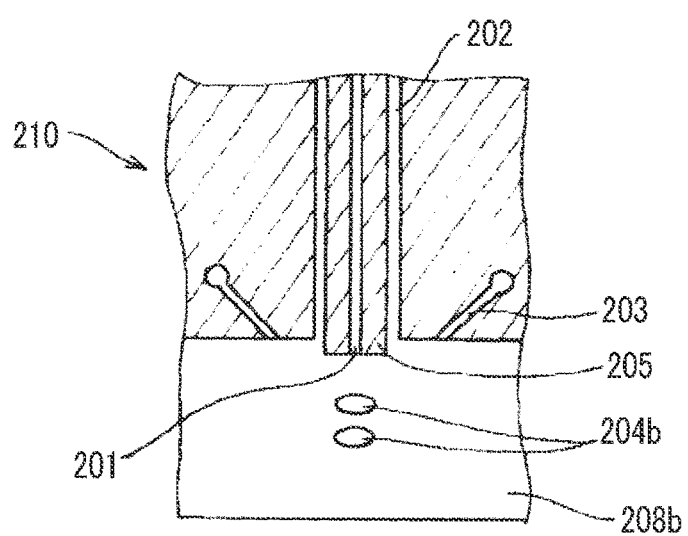
FIG. 6C is a cross-sectional view of the modified example of the spinning head, taken in the direction orthogonal to that of FIG. 6A.

FIGS. 6A to 6C show a modified example of the spinning head 210. FIG. 6A is a cross-sectional view of the spinning head 210 according to the modified example. FIG. 6B is a bottom view of the spinning head 210 according to the modified example. FIG. 6C is a cross-sectional view of the spinning head 210 according to the modified example, taken in the direction orthogonal to that of FIG. 6A.

As shown in FIGS. 6A to 6C, in the spinning head 210 according to the modified example, the small holes 203 are arranged in a circular pattern surrounding the spinning nozzle portion 205 (spinning nozzle 201). The small holes 203 are formed to be slightly inclined with respect to the horizontal plane, and high-temperature air is jetted from the small holes 203 in the arrow directions of FIG. 6B. High-temperature air jetted from such small holes 203 also contributes to stable spinning of the filaments 211.

As described above, the average diameter of the filaments constituting the transversely oriented filament nonwoven fabric thus manufactured is in the range of 1 to 4 μm (preferably 2 to 3 μm). The variation coefficient of the diameter distribution of the filaments constituting the transversely oriented filament nonwoven fabric thus manufactured is in the range of 0.1 to 0.3. The transversely oriented filament nonwoven fabric thus manufactured may have an elongation percentage in the range of 1 to 20%, preferably 5 to 15%, in the direction parallel to the filaments, that is, in the transverse direction which coincides with the axial direction and the drawing direction of the filaments. That is, the transversely oriented filament nonwoven fabric may be elastic in the transverse direction. The tensile strength in the transverse direction of the transversely oriented filament nonwoven fabric thus manufactured is 5 N/50 mm or more, preferably 10 N/50 mm or more, more preferably 20 N/50 mm or more.

Orthogonally Oriented Nonwoven Fabric

An orthogonally oriented nonwoven fabric is formed by any one of: stacking and fusing the longitudinally oriented filament nonwoven fabric and the transversely oriented filament nonwoven fabric together; stacking and fusing two sheets of the longitudinally oriented filament nonwoven fabric together in an arrangement in which one of the sheets is rotated by 90° with respect to the other, and stacking and fusing two sheets of the transversely oriented filament nonwoven fabric together in an arrangement in which one of the sheets is rotated by 90° with respect to the other. The fusing method used herein is not particularly limited, and fusion is generally through thermal compression using an embossing roller or the like.

Next, the nonwoven laminate will be described. Basically, the nonwoven laminate may be formed by any one of: stacking multiple sheets of the longitudinally oriented filament nonwoven fabric in their thickness direction; stacking multiple sheets of the transversely oriented filament nonwoven fabric in their thickness direction; and stacking multiple sheets of the orthogonally oriented nonwoven fabric in their thickness direction. However, the present invention is not limited to these. The nonwoven laminate may be formed of any combination of the longitudinally oriented filament nonwoven fabric, the transversely oriented filament nonwoven fabric, and the orthogonally oriented nonwoven fabric.

As described above, the sound absorbing material according to the present invention is formed by disposing the nonwoven fabric or the nonwoven laminate on at least one of the front and back surfaces of the porous sound absorber. Here, as described above, the orthogonally oriented nonwoven fabric may correspond to both the nonwoven fabric and the nonwoven laminate.

EXAMPLES

Hereinafter, the sound absorbing material according to the present invention will be described with reference to Examples. Note, however, that the present invention is not limited by Examples below.

Nonwoven Fabric

Longitudinally oriented filament nonwoven fabric was produced using the manufacturing apparatus shown in FIG. 3. A meltblowing die having spinning nozzles with a nozzle diameter of 0.15 mm, a nozzle pitch of 0.5 mm, LID ("nozzle hole length"/"nozzle hole diameter")=20, and a spinning width of 500 mm was used. The meltblowing die was disposed orthogonal to the travel direction of the conveyor. As a filament material (thermoplastic resin), a polyethylene terephthalate having an intrinsic viscosity (IV) of 0.53 and a melting point of 260° C. (manufactured by CHUNG SHING TEXTILE CO., LTD.) was used. Filaments were extruded from the meltblowing die with a discharge rate of 40 g/min per nozzle and a die temperature of 295° C. The high-speed airstream with a temperature of 400° C. and a flow rate of 0.4 m$^3$/min was generated for drafting the filaments extruded from the nozzles to reduce the filament diameter. The filaments were cooled by water mist sprayed by the spray nozzles. The airstream vibration mechanism was disposed so that the minimum distance from a vertical extension of each nozzle of the meltblowing die was 20 mm. The airstream vibration mechanism was rotated at 900 rpm (which produced the vibration frequency of 15.0 Hz on the circumferential wall surface of the airstream vibration mechanism). As a result, the filaments arranged and oriented in the longitudinal direction were collected on the conveyor belt. The filaments collected on the conveyor belt were heated and longitudinally drawn to be 4.5 times longer than the original length by the drawing cylinders. In this way, a longitudinally oriented filament nonwoven fabric was produced. Specifically, by appropriately changing the travel speed of the conveyor belt, a longitudinally oriented filament nonwoven fabric having a grammage of 5 to 40 g/m$^2$ was produced.

Figures 7, 8:
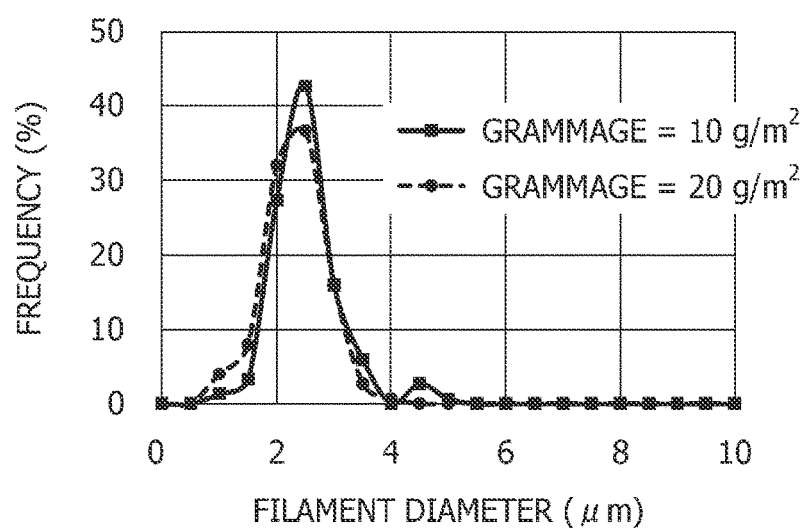
FIG. 7 is a table showing the physical properties of the longitudinally oriented filament nonwoven fabric.
FIG. 8 shows the filament diameter distribution of the longitudinally oriented filament nonwoven fabric.

FIG. 7 shows the physical properties of the resulting longitudinally oriented filament nonwoven fabric. FIG. 8 shows the filament diameter distribution of a longitudinally oriented filament nonwoven fabric having a grammage of 10 g/m$^2$ and the filament diameter distribution of a longitudinally oriented filament nonwoven fabric having a grammage of 20 g/m$^2$. As shown in FIG. 8, in both types of longitudinally oriented filament nonwoven fabric, the mode value of the filament diameter distribution was about 2.5 μm and the average filament diameter was also about 2.5 μm. It is likely that, in the longitudinally oriented filament nonwoven fabric having any of the grammages of 5 g/m$^2$, 15 g/m$^2$, 30 g/m$^2$, and 40 g/m$^2$, the mode value of the filament diameter distribution and average filament diameter would be substantially the same as those of FIG. 8 since such variations in grammage can be obtained simply by changing the travel speed of the conveyor belt during manufacture.

Porous Sound Absorber

A commercially available PET sound absorbing sheet (PET felt) was used as a porous sound absorber. The thickness of the PET felt was 10 mm and the grammage of the PET felt was 230 g/m$^2$.

EXAMPLES

Example 1 ("nonwoven fabric (20 g)"×3+"PET felt") was prepared by disposing (laminating) three sheets of longitudinally oriented filament nonwoven fabric having a grammage of 20 g/m$^2$ on a surface of the PET felt. Example 2 ("nonwoven fabric (20 g)"×5+"PET felt") was prepared by disposing five sheets of longitudinally oriented filament nonwoven fabric having a grammage of 20 g/m$^2$ on a surface of the PET felt. Example 3 ("nonwoven fabric (20 g)"×10+"PET felt") was prepared by disposing 10 sheets of longitudinally oriented filament nonwoven fabric having a grammage of 20 g/m$^2$ on a surface of the PET felt. Example 4 ("nonwoven fabric (20 g)"×20+"PET felt") was prepared by disposing 20 sheets of longitudinally oriented filament nonwoven fabric having a grammage of 20 g/m$^2$ on a surface of the PET felt.

REFERENCE EXAMPLES

Reference Example 1 ("nonwoven fabric (5 g)"+"PET felt") was prepared by disposing a single sheet of longitudinally oriented filament nonwoven fabric having a grammage of 5 g/m$^2$ on a surface of the PET felt. Reference Example 2 ("nonwoven fabric (10 g)"+"PET felt") was prepared by disposing a single sheet of longitudinally oriented filament nonwoven fabric having a grammage of 10 g/m$^2$ on a surface of the PET felt. Reference Example 3 ("nonwoven fabric (15 g)"+"PET felt") was prepared by disposing a single sheet of longitudinally oriented filament nonwoven fabric having a grammage of 15 g/m$^2$ on a surface of the PET felt. Reference Example 4 ("nonwoven fabric (20 g)"+"PET felt") was prepared by disposing a single sheet of longitudinally oriented filament nonwoven fabric having a grammage of 20 g/m$^2$ on a surface of the PET felt. Reference Example 5 ("nonwoven fabric (40 g)"+"PET felt") was prepared by disposing a single sheet of longitudinally oriented filament nonwoven fabric having a grammage of 40 g/m$^2$ on a surface of the PET felt.

COMPARATIVE EXAMPLES

Comparative Example 1 ("PET felt" alone) was prepared using the PET felt alone. Comparative Example 2 ("nonwoven fabric" alone) was prepared using the longitudinally oriented filament nonwoven fabric alone. Note that it was already confirmed that the sound absorption performance of the longitudinally oriented filament nonwoven fabric alone did not depend substantially on variations in grammage within the range of 5 to 40 g/m$^2$.

Sound Absorption Test

Figure 9:
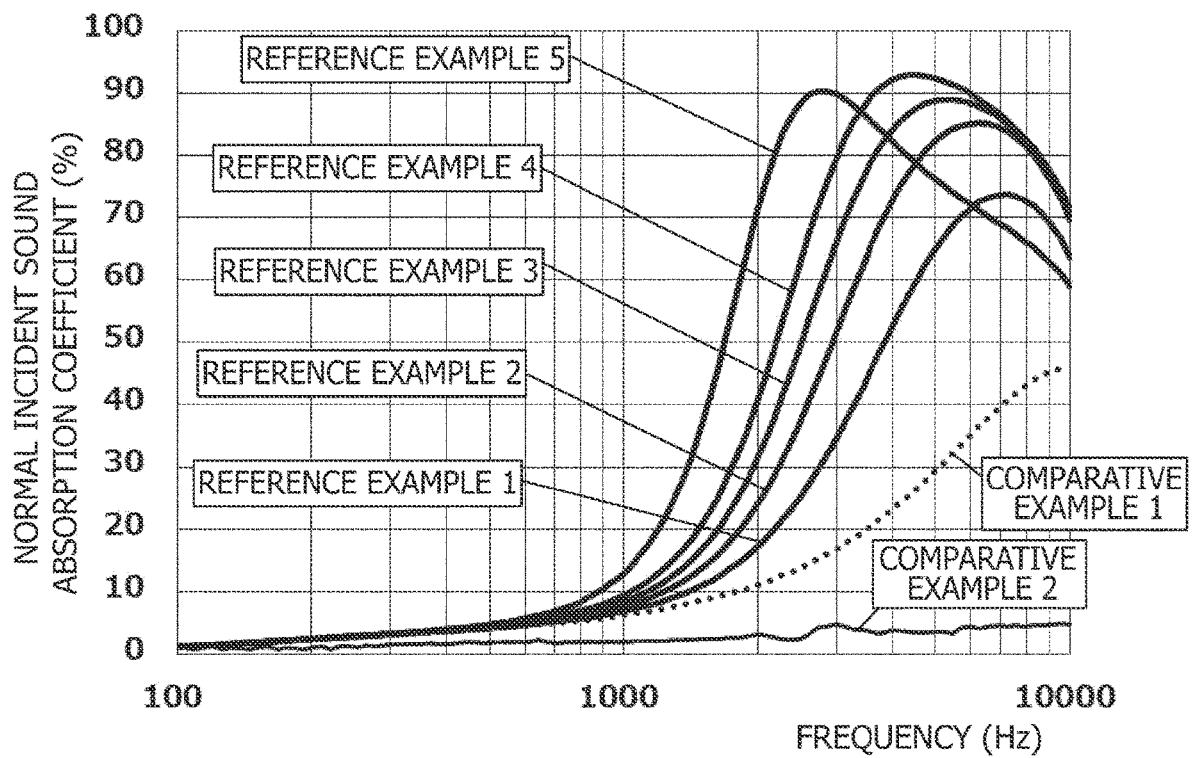
FIG. 9 is a graph showing the measurements of the normal incident sound absorption coefficient for Reference Examples 1 to 5 ("nonwoven fabric"+"PET felt") and Comparative Example 1 ("PET felt" alone) and Comparative Example 2 ("filament nonwoven fabric" alone).
Figure 10:
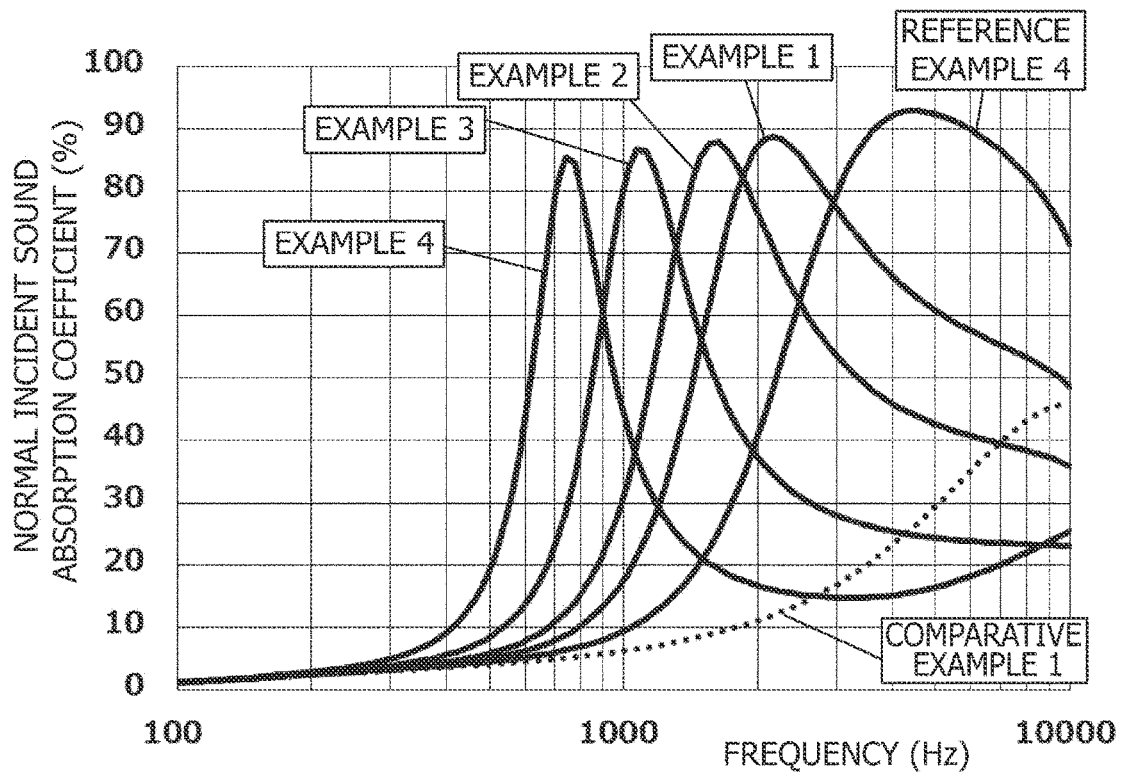
FIG. 10 is a graph showing the measurements of the normal incident sound absorption coefficient for Examples 1 to 4 ("nonwoven fabric"×n+"PET felt"), Reference Example 4, and Comparative Example 1.

Using the normal incident sound absorption coefficient measurement system WinZacMTX manufactured by Nihon Onkyo Engineering Co., Ltd., the normal incident sound absorption coefficient was measured as specified in JIS A1405-2 for each of Examples 1 to 4, Reference Examples 1 to 5, and Comparative Examples 1 and 2. FIG. 9 shows the measurements of the normal incident sound absorption coefficient for Reference Examples 1 to 5 and Comparative Examples 1 and 2. FIG. 10 shows the measurements of the normal incident sound absorption coefficient for Examples 1 to 4, Reference Example 4, and Comparative Example 1.

As shown in FIG. 9, it was confirmed that combining (a single sheet of) the nonwoven fabric with the PET felt (i.e., laminating (a single sheet of) the nonwoven fabric on the PET felt) provided a normal incident sound absorption coefficient that was greater than the sum of the individual normal incident sound absorption coefficients of the PET felt and the nonwoven fabric, and especially provided a normal incident sound absorption coefficient significantly improved in the frequency band of 1000 to 10000 Hz as compared to the PET felt alone. In the frequency band of 10000 Hz or less, the normal incident sound absorption coefficient of the PET felt alone was less than 50%, and the normal incident sound absorption coefficient of (a single sheet of) the nonwoven fabric was less than 10%.

Furthermore, as shown in FIG. 10, it was confirmed that combining two or more sheets of the nonwoven fabric with the PET felt (i.e., laminating two or more sheets of the nonwoven fabric on the PET felt) provided a normal incident sound absorption coefficient significantly improved in the frequency band of 10000 Hz or less, particularly in the frequency band of 6000 Hz or less as compared to the PET felt alone. The PET felt alone displayed little sound absorption capability (provided a normal incident sound absorption coefficient of less than 40%, specifically) in the frequency band of 6000 Hz or less. In other words, it was confirmed that the normal incident sound absorption coefficient of each combination of two or more nonwoven fabric sheets with the PET felt had a peak at a predetermined frequency of 6000 Hz or less, and the normal incident sound absorption coefficient reaches 40% or more at the peak, more specifically, reaches 50% or more at the peak. It was also confirmed that the peak of the normal incident sound absorption coefficient of such combination of the nonwoven fabric with the PET felt tends to shift towards a lower frequency as the greater number of sheets of the nonwoven fabric is used.

In summary, combining a nonwoven fabric as described above with a porous sound absorber such as the PET felt, particularly, combining a nonwoven fabric as described above with a porous sound absorber having a relatively poor sound absorption performance at a frequency of 10000 Hz or less, provides a sound absorption performance improved in the frequency band of 1000 to 10000 Hz as compared to the porous sound absorber alone. In particular, combining two or more sheets of the nonwoven fabric or the nonwoven laminate with a porous sound absorber provides a sound absorption performance significantly improved in a predetermined frequency band of 6000 Hz or less as compared to the porous sound absorber alone.

Furthermore, the peak of the normal incident sound absorption coefficient of such combination of the nonwoven fabric with the porous sound absorber varies depending on the number of sheets of the nonwoven fabric. Thus, it is possible to develop an optimum custom-made sound absorbing material by, for example, measuring in advance the frequency of sound that needs to be absorbed and adjusting the number etc. of the nonwoven fabric laminated on the porous sound absorber in accordance with this measured frequency.

The sound absorbing material according to the present invention may be used in a variety of applications. Example applications of the sound absorbing material according to the present invention may include a sound absorbing material for an engine compartment and for interior use in an automobile, a sound absorbing protective material for automobiles, for household electrical appliances, and for various motors, etc., a sound absorbing material to be installed in walls, floors, ceilings, etc. of various buildings, a sound absorbing material for interior use in machine rooms etc., a sound absorbing material for various sound insulating walls, and/or a sound absorbing material for office equipment such as copiers and multifunction machines.

REFERENCE SYMBOL LIST

51 Porous sound absorber
52 Nonwoven laminate

The invention claimed is:
1. A sound absorbing material formed by laminating a porous sound absorber and two or more sheets of a nonwoven fabric one on another,
wherein the nonwoven fabric has a plurality of drawn filaments arranged and oriented in one direction,
wherein a mode value of a diameter distribution of the plurality of filaments is in a range of 1 to 4 μm, and
wherein a grammage of the nonwoven fabric is in a range of 5 to 40 g/m2.
2. The sound absorbing material according to claim 1,
wherein the porous sound absorber is formed in a sheet shape or a block shape, and
wherein the nonwoven fabric or a nonwoven laminate formed of a stack of two or more sheets of the nonwoven fabric is disposed on at least one of front and back surfaces of the porous sound absorber.
3. The sound absorbing material according to claim 1,
wherein each of the plurality of filaments is drawn to be 3 to 6 times longer than an original length thereof,
wherein an average diameter of the plurality of filaments is in a range of 1 to 4 μm, and
wherein a variation coefficient of the diameter distribution of the plurality of filaments is in a range of 0.1 to 0.3.
4. The sound absorbing material according to claim 1, wherein a tensile strength of the nonwoven fabric in the one direction of the nonwoven fabric is 20 N/50 mm or more.
5. The sound absorbing material according to claim 1,
wherein a normal incident sound absorption coefficient of the sound absorbing material has a peak at a predetermined frequency of 6000 Hz or less, and
wherein the normal incident sound absorption coefficient reaches 40% or more at the peak.
6. The sound absorbing material according to claim 5, wherein a normal incident sound absorption coefficient of the porous sound absorber is 40% or less in a frequency band of 6000 Hz or less.
7. The sound absorbing material according to claim 1,
wherein a normal incident sound absorption coefficient of the porous sound absorber is 50% or less in a frequency band of 10000 Hz or less,
wherein a normal incident sound absorption coefficient of the sound absorbing material has a peak at a predetermined frequency of 6000 Hz or less, and
wherein the normal incident sound absorption coefficient reaches 50% or more at the peak.
8. The sound absorbing material according to claim 1, wherein each of the plurality of filaments mainly contains a polyester or a polypropylene.
9. The sound absorbing material according to claim 8, wherein the polyester is a polyethylene terephthalate having an intrinsic viscosity (IV) of 0.43 to 0.63.
10. The sound absorbing material according to claim 1, wherein the nonwoven fabric has a plurality of first drawn filaments arranged and oriented in one direction and a plurality of second drawn filaments arranged and oriented in a direction orthogonal to the one direction.
11. A sound absorbing material formed by laminating a porous sound absorber and two or more sheets of a nonwoven fabric one on another,
wherein the nonwoven fabric has a plurality of drawn filaments arranged and oriented in one direction,
wherein a mode value of a diameter distribution of the plurality of filaments is in a range of 1 to 4 μm,
wherein a grammage of the nonwoven fabric is in a range of 5 to 40 g/m2,
wherein each of the plurality of filaments mainly contains a polyester, and
wherein the polyester is a polyethylene terephthalate having an intrinsic viscosity (IV) of 0.43 to 0.63.

* * * * *